United States Patent
Hirata et al.

(10) Patent No.: US 9,328,022 B2
(45) Date of Patent: May 3, 2016

(54) COPOLYMER FOR DISPERSANT FOR CEMENT, DISPERSANT FOR CEMENT, AND CEMENT COMPOSITION

(71) Applicants: TECHNISCHE UNIVERSITAT MUNCHEN, Munich (DE); NIPPON SHOKUBAI CO., LTD., Osaka-shi, Osaka (JP)

(72) Inventors: Tsuyoshi Hirata, Hyogo (JP); Alex Lange, Furholzen (DE); Johann Plank, Munich (DE)

(73) Assignees: Nippon Shokubai Co., Ltd., Osaka (JP); Technische Universitat Munchen, Munich (DE)

( * ) Notice: Subject to any disclaimer, the term of this patent is extended or adjusted under 35 U.S.C. 154(b) by 0 days.

(21) Appl. No.: 14/388,181

(22) PCT Filed: Mar. 28, 2013

(86) PCT No.: PCT/EP2013/056800
§ 371 (c)(1),
(2) Date: Sep. 25, 2014

(87) PCT Pub. No.: WO2013/144332
PCT Pub. Date: Oct. 3, 2013

(65) Prior Publication Data
US 2015/0065615 A1    Mar. 5, 2015

(30) Foreign Application Priority Data

Mar. 30, 2012    (EP) .................... 12162379

(51) Int. Cl.
| | | |
|---|---|---|
| *C04B 24/26* | (2006.01) | |
| *C04B 24/00* | (2006.01) | |
| *C04B 28/02* | (2006.01) | |
| *C08F 283/06* | (2006.01) | |
| *C08L 71/02* | (2006.01) | |
| *C08F 216/14* | (2006.01) | |
| *C08G 65/332* | (2006.01) | |
| *C04B 103/00* | (2006.01) | |
| *C04B 103/40* | (2006.01) | |

(52) U.S. Cl.
CPC ............. *C04B 24/2694* (2013.01); *C04B 24/00* (2013.01); *C04B 24/267* (2013.01); *C04B 24/2647* (2013.01); *C04B 28/02* (2013.01); *C08F 216/1416* (2013.01); *C08F 283/06* (2013.01); *C08G 65/3324* (2013.01); *C08L 71/02* (2013.01); *C04B 2103/0062* (2013.01); *C04B 2103/408* (2013.01)

(58) Field of Classification Search
CPC ...................... C04B 24/269; C04B 2103/4084; C04B 24/2694; C04B 24/00; C04B 24/2647; C04B 24/267; C04B 2103/0062; C08F 216/1416; C08F 283/06; C08G 65/3324; C08L 71/02
USPC .............................................. 524/5; 526/271
See application file for complete search history.

(56) References Cited

U.S. PATENT DOCUMENTS

| 4,220,734 A | * | 9/1980 | Kosugi et al. .................... 525/85 |
| 6,239,241 B1 | * | 5/2001 | Yamato ................. C04B 24/165 |
| | | | 526/318.4 |
| 6,762,220 B1 | * | 7/2004 | Yaguchi .............. C04B 24/2647 |
| | | | 524/4 |

FOREIGN PATENT DOCUMENTS

| CN | 101817657 | | 9/2010 | |
| CN | 101851323 | | 10/2010 | |
| EP | 1 528 071 | | 5/2005 | |
| EP | 1528071 A1 | * | 5/2005 | |
| EP | 2 025 394 | | 2/2009 | |
| JP | 5-238796 | | 9/1993 | |
| JP | 9-183642 | | 7/1997 | |
| JP | 2003-183338 | | 7/2003 | |
| JP | EP 1528071 A1 | * | 5/2005 | .......... C04B 24/2647 |
| JP | 3946998 B | | 7/2007 | |
| JP | 4015088 B | | 11/2007 | |
| JP | 4394765 B | | 1/2010 | |

* cited by examiner

*Primary Examiner* — Michael M Bernshteyn
(74) *Attorney, Agent, or Firm* — Hamre, Schumann, Mueller & Larson, P.C.

(57) ABSTRACT

A copolymer that has sufficient dispersibility to various kinds of cements, including those having low fluidity (difficult cement). The copolymer is obtained by polymerizing monomer components including an unsaturated (poly)alkylene glycol ether monomer (a), an unsaturated carboxylic acid monomer (b), and an unsaturated cross-linkable monomer (c) or an unsaturated cross-linkable monomer (d). The unsaturated cross-linkable monomer (c) is allyl itaconate or allyl citraconate, or ester thereof. The unsaturated cross-linkable monomer (d) is an ester obtained by reaction of at least one acid, selected from the group consisting of (meth)acrylic acid, maleic acid, fumaric acid, itaconic acid, and citraconic acid and ester derived from the acids, with a (poly)alkylene glycol or a (poly)alkylene glycol ether.

15 Claims, No Drawings

COPOLYMER FOR DISPERSANT FOR CEMENT, DISPERSANT FOR CEMENT, AND CEMENT COMPOSITION

FIELD OF THE INVENTION

The present invention relates to a copolymer for a dispersant for cement, a dispersant for cement, and a cement composition.

BACKGROUND ART

A dispersant for cement is widely used as a water-reducing agent for cement compositions such as cement paste, mortar and concrete, and has become essential in constructing civil engineering and building structures and the like from cement compositions. Such dispersant for cement increases the fluidity of cement compositions and thereby reduces the water requirement of the cement compositions, and is therefore effective in improving the strength, durability and the like of hardened products. Among such dispersants for cement, those comprising a polycarboxylic acid copolymer exhibit superior water-reducing performance to naphthalene- and other polycondensate-based water reducing agents.

For example, the following polycarboxylate dispersants for cement are disclosed: an additive for cement, mortar and concrete, which is composed of polycarboxylic acid superplasticizers resulted from partial crosslinking polymerization of monomers (CN101817657A); a cement admixture including a copolymer obtained by polymerization of a polyalkylene glycol diester monomer having an unsaturated bond and an acrylic acid-based monomer, and/or a metal salt of the copolymer (JP-A Hei 05-238796); a cement admixture including a water-soluble polymer produced by polymerization of a (poly)alkylene glycol monoalkenyl ether monomer and a polyfunctional unsaturated monomer (JP-B 3946998); a cement additive including a polycarboxylic acid copolymer containing at least an unsaturated polyalkylene glycol ether monomer and an unsaturated mono(di) carboxylic acid monomer as monomer components, and/or its salt, and a polyalkylene glycol derivative (JP-B 4394765); a fluidity retaining agent for freshly mixed cement paste, mortar, concrete and the like, in particular a multi-branched polycarboxylic water reducer with an excellent performance in slump retention (CN101851323A); a dispersant for a hydraulic composition which includes a copolymer containing an alkylene glycol ether monomeric unit, a maleic acid monomeric unit, and a half ester monomeric unit of a maleic acid monomer unit and an alkylene glycol compound (JP-B 4015088); or the like.

SUMMARY OF THE INVENTION

As mentioned earlier, various dispersants for cement capable of exhibiting dispersibility (also referred to as fluidity) have been developed. However, the clinker and sulfate compositions of cements obtained from different manufactures can vary considerably as a result of large fluctuations in the calcination, cooling and grinding process and in the raw material composition. Therefore, it is known to these skilled in the art that some cements are easy to fluidify (i.e. they require a low dosage of superplasticizer) whereas other cements require substantial dosages to obtain a fluid concrete. In some cases, even at excessive dosages (e.g. 2-3%), high fluidity can not be obtained at all. Consequently, a dispersant for cement capable of exhibiting sufficiently good dispersibility to cements which are easy to fluidify but also to cements which are difficult to fluidify (difficult cements) has not yet been presented. Therefore, further improvements are required to achieve a dispersant for cement capable of exhibiting excellent dispersibility to various kinds of cement including difficult cement.

The present invention has been devised in view of the foregoing state of the art, and it is an object of the present invention to provide a novel copolymer capable of exhibiting excellent dispersibility to various kinds of cement including cement with low fluidity (difficult cement). It is also an object of the present invention to provide a dispersant for cement and a cement composition each containing the novel copolymer.

The present inventors made various investigations on polymers suitably applicable for a dispersant for cement, and the like. The inventors first noted that a copolymer obtained by using unsaturated monomer components including an unsaturated carboxylic acid monomer and an unsaturated (poly) alkylene glycol ether monomer can exhibit dispersibility at a certain high level because a carboxyl group derived from the unsaturated carboxylic acid monomer serves as an adsorptive group which adsorbs to cement particles, and a (poly)alkylene glycol chain derived from the unsaturated (poly)alkylene glycol ether monomer serves as a functional group which disperses the cement particles. Further, the inventors found that if a specific unsaturated cross-linkable monomer is further added to the unsaturated carboxylic acid monomer and the unsaturated (poly)alkylene glycol ether monomer so that a copolymer containing monomer components which at least include those three kinds of monomers is produced, such a copolymer is a novel copolymer and the copolymer can exhibit extremely high dispersibility. The copolymer is particularly excellent in cement dispersibility and can exhibit excellent dispersibility not only to cement having good fluidity, but also to cement showing poor response to superplasticizer addition (difficult cement), or specifically, to a cement containing component tricalcium aluminate ($3CaO.Al_2O_3$, hereinafter referred to as "$C_3A$") and calcium oxide, wherein a total amount of said component $C_3A$ and said calcium oxide in the cement is more than 4% by weight, and wherein the amount of said calcium oxide in the cement is more than 0.2% by weight. Accordingly, the above-mentioned problems can be admirably solved.

Namely, the present invention includes the structures (1) to (5) as shown below.

(1) A copolymer (1) obtainable by polymerizing monomer components comprising an unsaturated (poly)alkylene glycol ether monomer (a), an unsaturated carboxylic acid monomer (b) and an unsaturated cross-linkable monomer (c), wherein the unsaturated (poly)alkylene glycol ether monomer (a) is a compound represented by the formula (1):

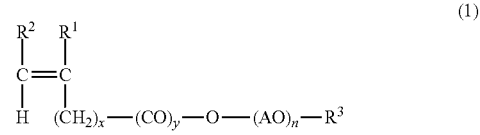

in the formula, $R^1$ and $R^2$ are the same as or different from each other and each represent a hydrogen atom or a methyl group;

$R^3$ represents a hydrogen atom or a hydrocarbon group containing 1 to 30 carbon atoms;

AOs are the same as or different from each other and each represent one or more different oxyalkylene groups containing 2 to 18 carbon atoms, wherein if there are two or more different oxyalkylene groups they are introduced in a form of blocks or randomly;

n represents the average number of moles of the added oxyalkylene group and is an integer of 1 to 300;

x is an integer of 0 to 2;

y is 0 or 1, and the unsaturated cross-linkable monomer (c) is at least one selected from the group consisting of a compound (c-i), a compound (c-ii), and a compound (c-iii), the compound (c-i) being an allyl itaconate, the compound (c-ii) being an allyl citraconate, the compound (c-iii) being an ester compound obtainable by a reaction of at least one acid selected from the group consisting of itaconic acid and citraconic acid or an acid ester derived from the acid, and one alcohol selected from the group consisting of vinyl alcohol, (meth)allyl alcohol and isoprene alcohol (3-methyl-3-buten-1-ol).

(2) A copolymer (2) obtainable by polymerizing monomer components comprising an unsaturated (poly)alkylene glycol ether monomer (a), an unsaturated carboxylic acid monomer (b), and an unsaturated cross-linkable monomer (d), wherein the unsaturated polyalkylene glycol ether monomer (a) is a compound represented by the formula (1):

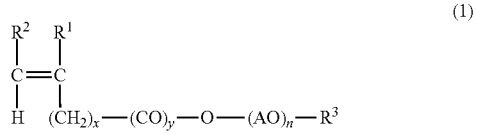

in the formula, $R^1$ and $R^2$ are the same as or different from each other and each represent a hydrogen atom or a methyl group;

$R^3$ represents a hydrogen atom or a hydrocarbon group containing 1 to 30 carbon atoms;

AOs are the same as or different from each other and each represent one or more different oxyalkylene groups containing 2 to 18 carbon atoms, wherein if there are two or more different oxyalkylene groups they are introduced in a form of blocks or randomly;

n represents the average number of moles of the added oxyalkylene group and is an integer of 1 to 300;

x is an integer of 0 to 2;

y is 0 or 1, and the unsaturated cross-linkable monomer (d) is at least one selected from the group consisting of a compound (d-i), a compound (d-ii), the compound (d-i) being a di-, a tri-, a tetra-, or a polyester compound having at least two unsaturated double bonds obtainable by a reaction of at least one acid selected from the group consisting of (meth)acrylic acid, maleic acid, fumaric acid, itaconic acid, and citraconic acid, or an acid ester derived from the acid, and (poly)alkylene glycol, the compound (d-ii) being a mono-, or a diester compound obtainable by a reaction of at least one acid selected from the group consisting of (meth)acrylic acid, maleic acid, fumaric acid, itaconic acid, and citraconic acid, or an acid ester derived from the acid, and at least one ether compound selected from the group consisting of (poly)alkylene glycol vinyl ether, (poly)alkylene glycol(meth)allyl ether, and (poly)alkylene glycol (3-methyl-3-butenyl) ether.

(3) The copolymer (1) and/or the copolymer (2), wherein the copolymer is to be added to a cement containing component $C_3A$ and calcium oxide, wherein a total amount of said component $C_3A$ and of said calcium oxide in the cement is more than 4% by weight, and wherein the amount of said calcium oxide in the cement is more than 0.2% by weight.

(4) A dispersant for cement containing said copolymer (1) and/or said copolymer (2).

(5) A cement composition, comprising said copolymer (1) and/or the copolymer (2), a cement and water, wherein the cement contains component $C_3A$ and calcium oxide, wherein a total amount of said component $C_3A$ and of said calcium oxide in the cement is more than 4% by weight, and wherein the amount of said calcium oxide in the cement is more than 0.2% by weight.

The following description will discuss the present invention in detail. Meanwhile, an embodiment including two or more preferable embodiments of the present invention mentioned below in combination is also a preferable embodiment of the present invention.

[Copolymer]

The copolymer (1) of the present invention is a copolymer obtainable by polymerizing monomer components including an unsaturated (poly)alkylene glycol ether monomer (a), an unsaturated carboxylic acid monomer (b), and an unsaturated cross-linkable monomer (c). In other words, the copolymer (1) is a copolymer containing a constitutional unit derived from an unsaturated (poly)alkylene glycol ether monomer (a), a constitutional unit derived from an unsaturated carboxylic acid monomer (b), and a constitutional unit derived from an unsaturated cross-linkable monomer (c).

Hereinafter, an unsaturated (poly)alkylene glycol ether monomer (a), an unsaturated carboxylic acid monomer (b), and an unsaturated cross-linkable monomer (c) are also referred to as "a monomer (a)," "a monomer (b)," and "a monomer (c)," respectively.

With regard to the monomer components to be used for obtaining the copolymer (1), the respective use ratios of the monomer (a), the monomer (b), and the monomer (c) are preferably as follows: monomer (a)/monomer (b)/monomer (c) (unit: % by mass)=from 1 to 99/from 0.5 to 98/from 0.5 to 98. The use ratio of the monomer (a) of less than 1% by mass results in an insufficient oxyalkylene group content in the copolymer (1). The use ratio of the monomer (c) of less than 0.5% by mass results in an insufficient crosslinking ratio of the copolymer (1). Therefore, in both of the above cases, sufficient dispersibility may not be achieved. The use ratio of the monomer (b) of less than 0.5% by mass results in an insufficient carboxylic group content in the copolymer (1). Therefore, excellent dispersibility may not be achieved. The respective use ratios of the monomers are more preferably as follows: monomer (a)/monomer (b)/monomer (c) (unit: % by mass)=from 50 to 98/from 1 to 49/from 1 to 49, and further preferably as follows: monomer (a)/monomer (b)/monomer (c) (unit: % by mass)=from 55 to 96/from 2 to 40/from 2 to 40.

The monomer component used for producing the copolymer (1) may further include another copolymerizable monomer (hereinafter, also referred to as "monomer (e1)") in addition to the monomers (a), (b), and (c). Examples of the monomer (e1) include an unsaturated cross-linkable monomer (d) and a monomer (hereinafter, also referred to as a monomer (e)) other than the monomers (a), (b), (c), and (d).

In the case of using the monomer (e1), the amount thereof is preferably 30% by mass or less for 100% by mass of all the monomer components. The amount is more preferably 25% by mass or less, and further preferably 20% by mass or less.

The monomers contained in the monomer components each may be used alone, or two or more of them may be used in combination.

The copolymer (1) preferably has a weight average molecular weight of 5000 to 5000000. By selecting such a weight average molecular weight range, it becomes possible to obtain a dispersant for cement capable of exerting higher levels of dispersibility. More preferably, the weight average molecular weight is not less than 10000 but not more than 2000000, still more preferably not less than 20000 but not more than 1500000.

Herein, the weight average molecular weight can be determined by gel permeation chromatography (hereinafter referred to as "GPC") and expressed on the polyethylene glycol equivalent. For example, it can be determined by the following measurement conditions.

[GPC Molecular Weight Measurement Conditions]

The polymers were characterized by gel permeation chromatography, using an Alliance 2695 separation module (Waters) equipped with a three angle static light scattering detector ("mini DAWN," Wyatt Technology Corp.) and a differential refractive index detector (RI-2414, Waters). The value of do/dc of 0.135 mL/g was used to calculate molar masses relative to polyethylene glycol. Prior to application on the columns, the 10 mg/mL polymer solution was filtered through a 0.2 μm filter:
Column: an Ultrahydrogel™ precolumn and three Ultrahydrogel™ columns (120, 250 and 500; Waters).
Eluent: An aqueous 0.1 M NaNO$_3$ solution adjusted to pH=12 with NaOH.
Eluent flow rate: 1.0 mL/min.
Standard samples: Polyethylene glycol The copolymer (2) of the present invention is a copolymer obtainable by polymerizing monomer components including an unsaturated (poly)alkylene glycol ether monomer (a), an unsaturated carboxylic acid monomer (b), and an unsaturated cross-linkable monomer (d). In other words, the copolymer (2) is a copolymer containing a constitutional unit derived from an unsaturated (poly)alkylene glycol ether monomer (a), a constitutional unit derived from an unsaturated carboxylic acid monomer (b), and a constitutional unit derived from an unsaturated cross-linkable monomer (d).

Hereinafter, the unsaturated cross-linkable monomer (d) is also referred to as "monomer (d)".

With regard to the monomer components to be used for obtaining the copolymer (2), the respective use ratios of the monomer (a), the monomer (b), and the monomer (d) are preferably as follows: monomer (a)/monomer (b)/monomer (d) (unit: % by mass)=from 1 to 99/from 0.5 to 98/from 0.5 to 98. The use ratio of the monomer (a) of less than 1% by mass results in an insufficient oxyalkylene group content in the copolymer (2). The use ratio of the monomer (d) of less than 0.5% by mass results in an insufficient crosslinking ratio of the copolymer (2). Therefore, in both of the above cases, a sufficient dispersibility may not be achieved. The use ratio of the monomer (b) of less than 0.5% by mass results in an insufficient carboxylic group content in the copolymer (2). Therefore, excellent dispersibility may not be achieved. The respective use ratios of the monomers are more preferably as follows: monomer (a)/monomer (b)/monomer (d) (unit: % by mass)=from 50 to 98/from 1 to 49/from 1 to 49, and further preferably as follows: monomer (a)/monomer (b)/monomer (d) (unit: % by mass)=from 55 to 96/from 2 to 40/from 2 to 40.

The monomer component to be used for producing the copolymer (2) may further include another copolymerizable monomer (hereinafter, also referred to as "monomer (e2)") in addition to the monomers (a), (b), and (d). Examples of the monomer (e2) include an unsaturated cross-linkable monomer (c) and a monomer (e).

In the case of using the monomer (e2), the amount thereof is preferably 30% by mass or less for 100% by mass of all the monomer components. The amount is more preferably 25% by mass or less, and further preferably 20% by mass or less.

The monomers contained in the monomer components each may be used alone, or two or more of these may be used in combination.

The copolymer (2) preferably has a weight average molecular weight of 5000 to 5000000. By selecting such a weight average molecular weight range, it becomes possible to obtain a dispersant for cement capable of exerting higher levels of dispersibility. More preferably, the weight average molecular weight is not less than 10000 but not more than 2000000, still more preferably not less than 20000 but not more than 1500000.

The following description will discuss the monomers constituting the copolymer (1) and the copolymer (2).

[Unsaturated (Poly)Alkylene Glycol Ether Monomer (a)]

The monomer (a) is a compound represented by the aforementioned formula (1). Here, the constitutional unit derived from the monomer (a) corresponds to the structure in which the polymeric double bond of the monomer (a) represented by formula (1) is cleaved by the polymerization reaction (the double bond (C=C) is cleaved to be a single bond).

Examples of the C1-C30 hydrocarbon group among the terminal groups represented by $R^3$ in the formula (1) include C1-C30 aliphatic alkyl groups, C3-C30 alicyclic alkyl groups, C2-C30 alkenyl groups, C2-C30 alkynyl groups, and C6-C30 aryl groups.

The terminal group represented by $R^3$ is preferably a hydrophilic group in terms of good dispersibility of cement particles in the case that the polymer is used for a dispersant for cement. Specifically, the terminal group represented by $R^3$ is preferably a hydrogen atom or a C1-C8 hydrocarbon group. It is more specifically a hydrogen atom or a C1-C6 hydrocarbon group, further preferably a hydrogen atom or a C1-C3 hydrocarbon group, and particularly preferably a hydrogen atom or a methyl group.

In the formula (1), AOs are the same as or different from each other and each represent one or more different oxyalkylene groups containing 2 to 18 carbon atoms. Herein, if there are two or more different oxyalkylene groups, they are introduced in a form of blocks or randomly.

The (poly)alkylene glycol chain represented by $(AO)_n$ in formula (1) is preferably one mainly comprising a C2 oxyethylene group (ethylene oxide). In such a case, the copolymer to be obtained is allowed to have sufficient hydrophilicity, and the copolymer of the present invention is imparted sufficient water solubility and sufficient dispersibility of cement particles.

Here, the phrase "mainly comprising" means that the mol % value of the oxyethylene group for 100 mol % of all the oxyalkylene groups (alkylene glycol units) constituting the polyalkylene glycol chain represented by $(AO)_n$ is preferably 50 to 100 mol %, for example. If the value is lower than 50 mol %, the oxyalkylene group will not impart sufficient hydrophilicity, and may not impart sufficient dispersibility of cement particles. The value is more preferably 60 mol % or more, further preferably 70 mol % or more, particularly preferably 80 mol % or more, and most preferably 90 mol % or more.

The (poly)alkylene glycol chain represented by $(AO)_n$ may partially contain an oxyalkylene group having three or more carbon atoms that have higher hydrophobicity. This is because, in the case that the polymer with such a hydrophobic group introduced therein is used for an admixture (dispersant) for cement, the (poly)alkylene glycol chains show mild hydrophobic interaction therebetween in the aqueous solution and the viscosity of the cement composition is controlled, and thereby the workability is improved in some cases. In the case of introducing an oxyalkylene group having three or more carbon atoms, the amount thereof is preferably 50 mol % or less for 100 mol % of all the oxyalkylene groups (alkylene glycol units) constituting the (poly)alkylene glycol chain represented by $(AO)_n$ for sufficiently maintained water solubility, for example. The amount is more preferably 25 mol % or less, and is further preferably 10 mol % or less. For improved workability, the amount is preferably 1 mol % or more. The amount is more preferably 2.5 mol % or more, and is further preferably 5 mol % or more.

The oxyalkylene group having three or more carbon atoms is preferably a propylene oxide group or a butylene oxide group for easy production; in particular, propylene oxide group is more preferable.

In the case that the (poly)alkylene glycol chain comprises a C2 oxyethylene group and an oxyalkylene group having three or more carbon atoms, these groups may be arranged randomly or in a block state. In the case of the block arrangement, the hydrophilicity of the hydrophilic block seems to be more strongly exerted and the hydrophobicity of the hydrophobic block seems to be more strongly exerted in comparison with the case of the random arrangement, and as a result the cement composition shows improved dispersibility and workability; thus, the block arrangement is preferable. In particular, the groups are preferably arranged in the state of an A-B-A block as (C2 oxyethylene groups)-(oxyalkylene groups each having three or more carbon atoms)-(C2 oxyethylene groups).

In formula (1), n is the number of 1 to 300; if n is greater than 300, some trouble may occur in the production. In the case that the polymer is used for a dispersant for cement, the cement composition may have high viscosity so that the workability may be insufficient. From the viewpoint of easy production, n is appropriately 300 or lower, preferably 200 or lower, more preferably 150 or lower, further preferably 100 or lower, particularly preferably 75 or lower, and most preferably 50 or lower. From the viewpoint of good dispersibility of cement particles, n is preferably 4 or greater, more preferably 6 or greater, further preferably 10 or greater, and particularly preferably 20 or greater.

The monomers (a) represented by the formula (1) in which y in the formula (1) is 1 correspond to unsaturated esters. Specific examples of the monomers (a) of this kind include (poly)alkylene glycol ester monomers.

The (poly)alkylene glycol ester monomers are not limited as long as they are monomers each having a structure in which an unsaturated group and a (poly)alkylene glycol chain are bonded via an ester bond. Examples thereof include unsaturated carboxylic polyalkylene glycol ester compounds such as (poly)alkylene glycol mono(meth)acrylates. Particularly preferable are (alkoxy)(poly)alkylene glycol mono(meth) acrylates.

Examples of the (alkoxy)(poly)alkylene glycol mono (meth)acrylate include esterified products between alkoxypolyalkylene glycols formed by adding 1 to 300 mols of C2-18 alkylene oxide to alcohols, in particular alkoxypolyalkylene glycols mainly containing ethylene oxide, and (meth)acrylic acid.

Examples of the alcohols include C1-C30 aliphatic alcohols such as methanol, ethanol, 1-propanol, 2-propanol, 1-butanol, 2-butanol, 1-pentanol, 2-pentanol, 3-pentanol, 1-hexanol, 2-hexanol, 3-hexanol, octanol, 2-ethyl-1-hexanol, nonyl alcohol, lauryl alcohol, cetyl alcohol, and stearyl alcohol; C3-C30 alicyclic alcohols such as cyclohexanol; and C3-C30 unsaturated alcohols such as (meth)allyl alcohol, 3-buten-1-ol, 3-methyl-3-buten-1-ol.

Specific examples of the esterified products include the following (alkoxy)polyethylene glycol (poly)(C2-C4 alkylene glycol)(meth)acrylates:

methoxypolyethylene glycol mono(meth)acrylate, methoxy{polyethylene glycol (poly) propylene glycol}mono (meth)acrylate, methoxy{polyethylene glycol (poly)butylene glycol}mono(meth)acrylate, methoxy{polyethylene glycol (poly)propylene glycol (poly)butylene glycol}mono (meth)acrylate, ethoxypolyethylene glycol mono(meth)acrylate, ethoxy{polyethylene glycol (poly)propylene glycol}mono(meth)acrylate, ethoxy{polyethylene glycol (poly)butylene glycol}mono(meth)acrylate, ethoxy{polyethylene glycol (poly)propylene glycol (poly) butylene glycol}mono(meth)acrylate, propoxypolyethylene glycol mono(meth)acrylate, propoxy{polyethylene glycol (poly)propylene glycol}mono(meth)acrylate, propoxy{polyethylene glycol (poly)butylene glycol}mono (meth)acrylate, propoxy{polyethylene glycol (poly)propylene glycol (poly)butylene glycol}mono(meth)acrylate, butoxypolyethylene glycol mono(meth)acrylate, butoxy{polyethylene glycol (poly)propylene glycol}mono (meth)acrylate, butoxy{polyethylene glycol (poly)butylene glycol}mono(meth)acrylate, butoxy{polyethylene glycol (poly)propylene glycol (poly)butylene glycol}mono(meth) acrylate, pentoxypolyethylene glycol mono(meth)acrylate, pentoxy{polyethylene glycol (poly) propylene glycol}mono (meth)acrylate, pentoxy{polyethylene glycol (poly)butylene glycol}mono(meth)acrylate, pentoxy{polyethylene glycol (poly) propylene glycol(poly)butylene glycol}mono(meth) acrylate, hexoxypolyethylene glycol mono(meth)acrylate, hexoxy{polyethylene glycol (poly)propylene glycol}mono (meth)acrylate, hexoxy{polyethylene glycol (poly)butylene glycol}mono(meth)acrylate, hexoxy{polyethylene glycol (poly)propylene glycol (poly)butylene glycol}mono(meth) acrylate, heptoxypolyethylene glycol mono(meth)acrylate, heptoxy{polyethylene glycol (poly)propylene glycol}mono (meth)acrylate, heptoxy{polyethylene glycol (poly)butylene glycol}mono(meth)acrylate, heptoxy{polyethylene glycol (poly)propylene glycol (poly)butylene glycol}mono(meth) acrylate, octoxypolyethylene glycol mono(meth)acrylate, octoxy{polyethylene glycol (poly)propylene glycol}mono (meth)acrylate, octoxy{polyethylene glycol (poly)butylene glycol}mono(meth)acrylate, octoxy{polyethylene glycol (poly)propylene glycol (poly)butylene glycol}mono(meth) acrylate, nonanoxypolyethylene glycol mono(meth)acrylate, nonanoxy{polyethylene glycol (poly)propylene glycol}mono(meth)acrylate, nonanoxy{polyethylene glycol (poly)butylene glycol}mono(meth)acrylate, and nonanoxy{polyethylene glycol (poly) propylene glycol (poly)butylene glycol}mono(meth)acrylate.

The monomers (a) represented by the formula (1) in which y in the formula is 0 correspond to unsaturated ethers. Specific examples of the monomers (a) of this kind include unsaturated alcohol (poly)alkylene glycol adducts.

The unsaturated alcohol (poly)alkylene glycol adducts are not limited as long as they are compounds each having a structure in which a (poly)alkylene glycol chain is added to an alcohol having an unsaturated group.

Examples of the unsaturated alcohol (poly)alkylene glycol adducts include vinyl alcohol alkylene oxide adducts, (meth) allyl alcohol alkylene oxide adducts, 3-buten-1-ol alkylene oxide adducts, and isoprene alcohol (3-methyl-3-buten-1-ol) alkylene oxide adducts.

Specific examples of the unsaturated alcohol (poly)alkylene glycol adducts include polyethylene glycol mono vinyl ether, polyethylene glycol (poly)propylene glycol mono vinyl ether, polyethylene glycol (poly)butylene glycol mono vinyl ether, polyethylene glycol (poly)propylene glycol (poly)butylene glycol mono vinyl ether, polyethylene glycol mono allyl ether, polyethylene glycol (poly)propylene glycol mono allyl ether, polyethylene glycol (poly)butylene glycol monoallyl ether, polyethylene glycol (poly)propylene glycol (poly)butylene glycol monoallyl ether, polyethylene glycol mono (2-methyl-2-propenyl) ether, polyethylene glycol (poly)propylene glycol mono (2-methyl-2-propenyl) ether, polyethylene glycol (poly)butylene glycol mono (2-methyl-2-propenyl) ether, polyethylene glycol (poly)propylene glycol (poly)butylene glycol mono (2-methyl-2-propenyl) ether, polyethylene glycol mono (3-butenyl) ether, polyethylene glycol (poly)propylene glycol mono (3-butenyl) ether, polyethylene glycol (poly)butylene glycol mono (3-butenyl) ether, polyethylene glycol (poly)propylene glycol (poly)butylene glycol mono (3-butenyl) ether, polyethylene glycol mono (3-methyl-3-butenyl) ether, polyethylene glycol (poly)propylene glycol mono (3-methyl-3-butenyl) ether, polyethylene glycol (poly)butylene glycol mono (3-methyl-3-butenyl) ether, polyethylene glycol (poly)propylene glycol (poly)butylene glycol mono (3-methyl-3-butenyl) ether, methoxy polyethylene glycol mono vinyl ether, ethoxy polyethylene glycol mono vinyl ether, 1-propoxy polyethylene glycol mono vinyl ether, cyclohexyloxy polyethylene glycol mono vinyl ether, phenoxy polyethylene glycol mono vinyl ether, methoxy polyethylene glycol mono allyl ether, ethoxy polyethylene glycol mono allyl ether, 1-propoxy polyethylene glycol mono allyl ether, cyclohexyloxy polyethylene glycol mono allyl ether, phenoxy polyethylene glycol mono allyl ether, methoxy polyethylene glycol mono (2-methyl-2-propenyl) ether, ethoxy polyethylene glycol mono (2-methyl-2-propenyl) ether, 1-propoxy polyethylene glycol mono (2-methyl-2-propenyl) ether, cyclohexyloxy polyethylene glycol mono (2-methyl-2-propenyl) ether, phenoxy polyethylene glycol mono (2-methyl-2-propenyl) ether, methoxy polyethylene glycol mono (3-butenyl) ether, ethoxy polyethylene glycol mono (3-butenyl) ether, 1-propoxy polyethylene glycol mono (3-butenyl) ether, cyclohexyloxy polyethylene glycol mono (3-butenyl) ether, phenoxy polyethylene glycol mono (3-butenyl) ether, methoxy polyethylene glycol mono (3-methyl-3-butenyl) ether, ethoxy polyethylene glycol mono (3-methyl-3-butenyl) ether, 1-propoxy polyethylene glycol mono (3-methyl-3-butenyl) ether, cyclohexyloxy polyethylene glycol mono (3-methyl-3-butenyl) ether, and phenoxy polyethylene glycol mono (3-methyl-3-butenyl) ether.

In the above-mentioned unsaturated esters and unsaturated ethers, one or more different alkylene oxides selected from alkylene oxides containing 2 to 18 carbon atoms such as an ethylene oxide, a propylene oxide, a butylene oxide, and a styrene oxide are preferably used as the alkylene oxide. If two or more different alkylene oxides are added, they may be added randomly, in block, or alternatively.

[Unsaturated Carboxylic Monomer (b)]

The monomer (b) is an unsaturated carboxylic acid or a salt thereof. Preferable examples of the monomer (b) include compounds represented by the following formula (2):

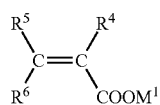

(2)

wherein $R^4$, $R^5$, and $R^6$ each are a hydrogen atom, a methyl group, or $(CH_2)_zCOOM^2$ and may be the same as or different from each other; $—(CH_2)_zCOOM^2$ may form an anhydride with $—COOM^1$ or other $—(CH_2)_zCOOM^2$; Z is an integer of 0 to 2; $M^1$ and $M^2$ each are a hydrogen atom, a monovalent metal, a divalent metal, a trivalent metal, a quaternary ammonium salt group, or an organic amine salt group, and may be the same as or different from each other.

Here, the constitutional unit derived from the monomer (b) corresponds to a structure in which the polymeric double bond of the monomer (b) is cleaved by the polymerization reaction (the double bond (C=C) is cleaved to be a single bond (—C—C—)).

Examples of the metal atoms represented by $M^1$ and $M^2$ in formula (2) include monovalent metal atoms such as alkaline metal atoms e.g. lithium, sodium, and potassium; divalent metal atoms such as alkaline earth metal atoms e.g. calcium and magnesium; and trivalent metal atoms such as aluminum and iron. Examples of the organic amine salt group include alkanol amine groups such as an ethanol amine group, a diethanol amine group, and a triethanol amine group, and a triethyl amine group.

Specific examples of the monomer (b) include: monocarboxylic monomers such as acrylic acid, methacrylic acid, and crotonic acid; dicarboxylic monomers such as maleic acid, itaconic acid, citraconic acid, and fumaric acid; and anhydrides and salts of these carboxylic acids (e.g. alkaline metal salts, alkaline earth metal salts, trivalent metal salts, ammonium salts, and organic amine salts). Particularly preferable are acrylic acid, methacrylic acid, maleic acid, maleic anhydride, and salts thereof for good polymerizability; more preferable are acrylic acid, methacrylic acid, and salts thereof.

Herein, acrylic acid and methacrylic acid may be collectively referred to as "(meth)acrylic acid".

[Unsaturated Cross-Linkable Monomer (c)]

The monomer (c) is at least one compound selected from the group consisting of the compounds (c-i), (c-ii), and (c-iii) mentioned earlier. The at least one acid selected from the group consisting of itaconic acid and citraconic acid is also referred to as "acid (C1)," and the one alcohol selected from the group consisting of vinyl alcohol, (meth)allyl alcohol and isoprene alcohol (3-methyl-3-buten-1-ol) is also referred to as "alcohol (C2)".

Herein, methallyl alcohol and allyl alcohol may be collectively referred to as "(meth)allyl alcohol".

The ester compound of the above (c-iii) is an ester compound obtainable by esterification reaction of the acid (C1) and the alcohol (C2), or an ester compound obtainable by transesterification reaction of an acid ester derived from the acid (C1) and the alcohol (C2).

The acid ester is not particularly limited, as long as it is one derived from at least one acid selected from the group consisting of itaconic acid and citraconic acid. For example, the acid ester is preferably a compound obtained by a reaction of the acid and any alcohol. The alcohol to be used is not particularly limited.

Examples of the monomer compound (c-iii) include the following monoester compounds and diester compounds: monoester compounds such as vinyl itaconate, vinyl citraconate, (meth)allyl itaconate, (meth)allyl citraconate, (3-methyl-3-butenyl) itaconate, and (3-methyl-3-butenyl) citraconate; and diester compounds such as divinyl itaconate, divinyl citraconate, di(meth)allyl itaconate, di(meth)allyl citraconate, di(3-methyl-3-butenyl) itaconate, di(3-methyl-3-butenyl) citraconate, or the like. Each of these may be used alone or two or more of these may be used in combination.

The esterification reaction or transesterification reaction to obtain the monoester compound of the above (c-iii) is performed by normal technique and is not particularly limited.

The reaction ratio between the acid (C1) and the alcohol (C2) is not particularly limited, and is preferably set for example in the following range: acid/alcohol=from 1/3 to 3/1 (molar ratio).

The reaction ratio between the acid ester and the alcohol (C2) is also not particularly limited, and is preferably set for example in the following range: acid ester/alcohol=from 1/3 to 3/1 (molar ratio).

[Unsaturated Cross-Linkable Monomer (d)]

The monomer (d) is at least one compound selected from the group consisting of the compounds (d-i) and (d-ii) mentioned earlier.

The at least one acid selected from the group consisting of (meth)acrylic acid, maleic acid, fumaric acid, itaconic acid, and citraconic acid is also referred to as "acid (D1)", and at least one ether compound selected from the group consisting of (poly)alkylene glycol vinyl ether, (poly)alkylene glycol (meth)allyl ether, and (poly)alkylene glycol (3-methyl-3-butenyl) ether is also referred to as "ether compound (D2)."

The acid ester derived from the acid (D1) may be any acid ester as long as it is one derived from at least one acid selected from the group consisting of (meth)acrylic acid, maleic acid, fumaric acid, itaconic acid, and citraconic acid. For example, the acid ester is preferably a compound obtained by a reaction of the acid (D1) and any alcohol. The alcohol to be used is not particularly limited.

The esterification reaction or transesterification reaction for obtaining the ester compounds of the above (d-i) and (d-ii) may be performed by normal technique, and is not particularly limited.

In the compounds (d-i), the reaction ratio between the acid (D1) and the (poly)alkylene glycol is not particularly limited, and is preferably set for example in the following range: acid/(poly)alkylene glycol=from 1/3 to 3/1 (molar ratio). The reaction ratio between the acid ester and the (poly)alkylene glycol is also not particularly limited, and is preferably set for example in the following range: acid ester/(poly)alkylene glycol=from 1/3 to 3/1 (molar ratio).

In the compounds (d-ii), the reaction ratio between the acid (D1) and the ether compound (D2) is not particularly limited, and is preferably set for example in the following range: acid/ether compound=from 1/3 to 3/1 (molar ratio). The reaction ratio between the acid ester and the ether compound (D2) is also not particularly limited, and is preferably set for example in the following range: acid ester/ether compound=from 1/3 to 3/1 (molar ratio).

The following compounds may be exemplified as specific examples of the respective monomer compounds (d-i) and (d-ii), and each of these may be used alone or two or more of these may be used in combination.

Specific Examples of Monomer Compound (d-i)

(poly)alkylene glycol di(meth)acrylate such as ethylene glycol di(meth)acrylate, polyethylene glycol di(meth)acrylate, (poly)propylene glycol di(meth)acrylate, and (poly)ethylene glycol (poly)propylene glycol di(meth)acrylate;

(poly)alkylene glycol dimaleate such as ethylene glycol dimaleate, polyethylene glycol dimaleate, (poly)propylene glycol dimaleate, and (poly)ethylene glycol (poly)propylene glycol dimaleate;

(poly)alkylene glycol difumarate such as ethylene glycol difumarate, polyethylene glycol difumarate, (poly)propylene glycol difumarate, and (poly)ethylene glycol (poly)propylene glycol difumarate;

(poly)alkylene glycol diitaconate such as ethylene glycol diitaconate, polyethylene glycol diitaconate, (poly)propylene glycol diitaconate, and (poly)ethylene glycol (poly)propylene glycol diitaconate;

(poly)alkylene glycol dicitraconate such as ethylene glycol dicitraconate, polyethylene glycol dicitraconate, (poly)propylene glycol dicitraconate, and (poly)ethylene glycol (poly)propylene glycol dicitraconate;

Polyester polymer of the acid (D1) and (poly)alkylene glycol such as polyester polymer of maleic acid and (poly)alkylene glycol, polyester polymer of fumaric acid and (poly)alkylene glycol, polyester polymer of itaconic acid and (poly)alkylene glycol, and polyester polymer of citraconic acid and (poly)alkylene glycol;

Polyester polymer consisting of a combination of at least two acids among the acid (D1), and (poly)alkylene glycol; and Polyester polymer consisting of a combination of at least one acid among the acid (D1) with (meth)acrylic acid, and (poly)alkylene glycol; and the like.

Specific Examples of Monomer Compound (d-ii)

(poly)alkylene glycol(meth)acrylate such as vinyl-(poly)ethylene glycol(meth)acrylate, vinyl-(poly)propylene glycol (meth)acrylate, vinyl-(poly)ethylene glycol (poly)propylene glycol(meth)acrylate, (meth)allyl-(poly)ethylene glycol (meth)acrylate, (meth)allyl-(poly)propylene glycol(meth)acrylate, (meth)allyl-(poly)ethylene glycol (poly)propylene glycol(meth)acrylate, (3-methyl-3-butenyl)-(poly)ethylene glycol(meth)acrylate, (3-methyl-3-butenyl)-(poly)propylene glycol(meth)acrylate, and (3-methyl-3-butenyl)-(poly)ethylene glycol (poly) propylene glycol(meth)acrylate;

(poly)alkylene glycol dimaleate such as vinyl-(poly)ethylene glycol dimaleate, vinyl-(poly)propylene glycol dimaleate, vinyl-(poly)ethylene glycol (poly)propylene glycol dimaleate, (meth)(poly)ethylene glycol dimaleate, (meth)allyl-(poly)propylene glycol dimaleate, (meth)allyl-(poly)ethylene glycol (poly)propylene glycol dimaleate, (3-methyl-3-butenyl)-(poly)ethylene glycol dimaleate, (3-methyl-3-butenyl)-(poly)propylene glycol dimaleate, and (3-methyl-3-butenyl)-(poly)ethylene glycol (poly)propylene glycol dimaleate;

(poly)alkylene glycol fumarate such as vinyl-(poly)ethylene glycol fumarate, vinyl-(poly)propylene glycol fumarate, vinyl-(poly)ethylene glycol (poly)propylene glycol fumarate, (meth)allyl-(poly)ethylene glycol fumarate, (meth)allyl-(poly)propylene glycol fumarate, (meth)allyl-(poly)ethylene glycol(poly)propylene glycol fumarate, (3-methyl-3-butenyl)-(poly)ethylene glycol fumarate, (3-methyl-3-butenyl)-(poly)propylene glycol fumarate, and (3-methyl-3-butenyl)-(poly)ethylene glycol(poly)propylene glycol fumarate;

(poly)alkylene glycol itaconate such as vinyl-(poly)ethylene glycol itaconate, vinyl-(poly)propylene glycol itaconate, vinyl-(poly)ethylene glycol (poly)propylene glycol itaconate, (meth)allyl-(poly)ethylene glycol itaconate, (meth)allyl-(poly)propylene glycol itaconate, (meth)allyl-(poly)ethylene glycol(poly)propylene glycol itaconate, (3-methyl-3-butenyl)-(poly)ethylene glycol itaconate, (3-methyl-3-butenyl)-(poly)propylene glycol itaconate, and (3-methyl-3-butenyl)-(poly)ethylene glycol (poly)propylene glycol itaconate; and (poly)alkylene glycol citraconate such as vinyl-(poly)ethylene glycol citraconate, vinyl-(poly)propylene glycol citraconate, vinyl-(poly)ethylene glycol (poly)propylene glycol citraconate, (meth)allyl-(poly)ethylene glycol citraconate, (meth)allyl-(poly)propylene glycol citraconate, (meth)allyl-(poly)ethylene glycol (poly)propylene glycol citraconate, (3-methyl-3-butenyl)-(poly)ethylene glycol citraconate, (3-methyl-3-butenyl)-(poly)propylene glycol citraconate, and (3-methyl-3-butenyl)-(poly)ethylene glycol (poly)propylene glycol citraconate.

[Other Monomers]

As mentioned earlier, the monomer components to be used to obtain the copolymer (1) may include the copolymerizable monomers (e1) other than the monomers (a), (b), and (c). As such other monomers (e1), for example, the aforementioned monomers (d) and monomers (e) to be described below may be used alone, or two or more of these may be used in combination.

The monomer components to be used to obtain the copolymer (2) may include copolymerizable monomers (e2) other than the monomers (a), (b), and (d). As such other monomers (e2), for example, the aforementioned monomers (c) and monomers (e) to be described below may be used alone, or two or more of these may be used in combination.

Specific examples of the monomer (e) include the following compounds (except for those compounds corresponding to the monomer (c) and the monomer (d)), and each of these may be used alone or two or more of these may be used in combination:

Half esters and diesters between unsaturated dicarboxylic monomers, e.g. maleic acid, maleic anhydride, fumaric acid, itaconic acid, and citraconic acid, and C23-C30 alcohols; half amides and diamides between the unsaturated dicarboxylic monomers and C23-C30 amines; half esters and diesters between alkyl(poly)alkylene glycols prepared by adding 1 to 500 mol of a C2-C18 alkylene oxide to the alcohol or amine and the unsaturated dicarboxylic monomers; half esters and diesters between the unsaturated dicarboxylic monomers and C5-C18 glycols or polyalkylene glycols with the number of moles of these glycols added of 2 to 500; half amides between maleamic acid and C5-C18 glycols or polyalkylene glycols with the number of moles of these glycols added of 2 to 500;

(poly)alkylene glycol di(meth)acrylates such as triethylene glycol di(meth)acrylate, (poly)ethylene glycol di(meth)acrylate, polypropylene glycol di(meth)acrylate, and (poly)ethylene glycol (poly)propylene glycol di(meth)acrylate; polyfunctional (meth)acrylates such as hexanediol di(meth)acrylate, trimethylolpropane tri(meth)acrylate, and trimethylolpropane di(meth)acrylate; (poly)alkylene glycol dimaleates such as triethylene glycol dimaleate and polyethylene glycol dimaleate; unsaturated sulfonic acid such as vinyl sulfonic acid, (meth)allyl sulfonic acid, 2-(meth)acryloxyethyl sulfonic acid, 3-(meth)acryloxypropyl sulfonate sulfonic acid, 3-(meth)acryloxy-2-hydroxypropyl sulfonic acid, 3-(meth)acryloxy-2-hydroxypropyl sulfonyl ether, 3-(meth)acryloxy-2-hydroxypropyl oxysulfobenzoate, 4-(meth)acryloxybutyl sulfonic acid, (meth)acrylamidomethyl sulfonic acid, (meth)acrylamidoethyl sulfonic acid, 2-methyl-propane sulfonate (meth)acrylamide, and styrene sulfonic acid; and monovalent metal salts, divalent metal salts, ammonium salts, and organoamine salts thereof;

amides of unsaturated monocarboxylic acids and C1-C30 amines such as methyl(meth)acrylamide; vinyl aromatic compounds such as styrene, α-methyl styrene, vinyl toluene, and p-methyl styrene; alkanediol mono(meth)acrylates such as 1,4-butanediol mono(meth)acrylate, 1,5-pentanediol mono(meth)acrylate, and 1,6-hexanediol mono(meth)acrylate; dienes such as butadiene, isoprene, 2-methyl-1,3-butadiene, and 2-chloro-1,3-butadiene; unsaturated amides such as (meth)acryl amide, (meth)acryl alkyl amides, N-methylol (meth)acrylamide, and N,N-dimethyl(meth)acrylamide; unsaturated cyanogens such as (meth)acrylonitrile and α-chloro acrylonitrile; and unsaturated esters such as vinyl acetate and vinyl propionate.

The above copolymers (1) and (2) each can be produced by polymerizing the monomer components using a polymerization initiator. The polymerization can be carried out in the manner of solution polymerization or bulk polymerization, for instance.

The solution polymerization can be carried out either batchwise or continuously. Suited for use as the solvent on that occasion are water; lower alcohols such as methyl alcohol, ethyl alcohol and isopropyl alcohol; aromatic or aliphatic hydrocarbons such as benzene, toluene, xylene, cyclohexane and n-hexane; ester compounds such as ethyl acetate; and ketone compounds such as acetone and methyl ethyl ketone. These may be used alone, or two or more of them may be used in combination. Among the above examples, in view of the solubilities of the starting monomers and the copolymers to be obtained, and the convenience in using the polymers, at least one solvent selected from the group consisting of water and lower alcohols containing 1 to 4 carbon atoms is preferably used. In that case, methyl alcohol, ethyl alcohol and isopropyl alcohol are particularly effective among lower alcohols containing 1 to 4 carbon atoms.

In carrying out the polymerization in aqueous solution, those to be used as a radical polymerization initiator include a water-soluble polymerization initiator, for example, a persulfate salt such as ammonium persulfate, sodium persulfate or potassium persulfate; hydrogen peroxide; or a water-soluble azo initiator, for example an azoamidine compound such as 2,2'-azobis-2-methylpropionamidine hydrochloride, a cyclic azoamidine compound such as 2,2'-azobis-2-(2-imidazolin-2-yl)propane hydrochloride, or an azonitrile compound such as 2-carbamoylazoisobutyronitrile. On that an accelerator may be used in combination, for example an alkali metal sulfite such as sodium hydrogen sulfite, a metabisulfite, sodium hypophosphite, an Fe(II) salt such as Mohr's salt, sodium hydroxymethanesulfinate dihydrate, hydroxylamine hydrochloride, thiourea, L-ascorbic acid (salt) or erythorbic acid (salt). When hydrogen peroxide is used as the water-soluble polymerization initiator, such an accelerator as Fe(II) salts or L-ascorbic acid (salt) is preferably used in combination.

In carrying out the polymerization using a lower alcohol, aromatic hydrocarbon, aliphatic hydrocarbon, ester compound or ketone compound as the solvent, a peroxide such as benzoyl peroxide or lauroyl peroxide; a hydroperoxide such as cumene hydroperoxide; or such an azo compound as azo-bisisobutyronitrile, for instance, is used as the polymerization initiator. On that occasion, an accelerator such as an amine compound may be used in combination. Further, when a mixed solvent composed of water and a lower alcohol is used, an appropriate polymerization initiators or polymerization initiator-accelerator combination can be selected from among the above-mentioned various initiator or initiator-accelerator combinations. The polymerization temperature may appropriately be selected depending on the solvent and polymerization initiator employed. Generally, the polymerization is carried out at 0 to 120° C.

The above-mentioned bulk polymerization is carried out at a temperature of 50 to 200° C. using, as the polymerization initiator, peroxide such as benzoyl peroxide or lauroyl peroxide; a hydroperoxide such as cumene hydroperoxide; or an azo compound such as azobisisobutyronitrile, for instance.

The method of adding the monomer components or polymerization initiator, etc. to the reaction vessel in the above-mentioned polymerization reaction is not particularly limited. Suitable examples of the method include a method comprising charging the reaction vessel with all the monomer components and then adding the polymerization initiator thereto to conduct copolymerization; a method comprising charging the reaction vessel with some of the monomer components and then adding the polymerization initiator and residual monomer components thereto to conduct polymerization; and a method comprising charging the reaction vessel with the polymerization solvent and then adding the whole amount of the monomer components and polymerization initiator thereto. Among such methods, the method comprising carrying out the polymerization by adding dropwise the polymerization initiator and the monomer components successively to the reaction vessel is preferred since the molecular weight distribution of the product copolymer can be made narrow (sharp), and the cement dispersibility for increasing the fluidity of cement compositions and the like can be improved thereby. Furthermore, the copolymerization reaction is preferably carried out with maintaining the concentration of the solvent in the reaction vessel at not more than 80% during the polymerization since the preservation stability of the obtained polymer is more improved by the improvement of the copolymerizability of the monomer components. More preferably, it is not more than 70%, still more preferably not more than 60%.

Furthermore, the copolymerization reaction is preferably carried out while maintaining the concentration of the solvent in the reaction vessel at not more than 50% during the polymerization. More preferably, it is not more than 40%, still more preferably not more than 30%.

In the polymerization reaction, chain transfer agents may be used, if necessary. As the chain transfer agents, known hydrophobic chain transfer agents or hydrophilic chain transfer agents may be used alone, or two or more of these may be used in combination.

Suitable as the above hydrophobic chain transfer agent are thiol compounds having a hydrocarbon group containing not less than 3 carbon atoms or compounds whose solubility in water at 25° C. is not more than 10%. For example, suitable are thiol chain transfer agents such as butanethiol, octanethiol, decanethiol, dodecanethiol, hexadecanethiol, octadecanethiol, cyclohexyl mercaptan, thiophenol, octyl thioglycolate, octyl 2-mercaptopropionate, octyl 3-mercaptopropionate, 2-ethylhexyl mercaptopropionate, 2-mercaptoethyl octanoate, 1,8-dimercapto-3,6-dioxaoctane, decanetrithiol, and dodecyl mercaptan; halides such as carbon tetrachloride, carbon tetrabromide, methylene chloride, bromoform, and bromotrichloroethane; unsaturated hydrocarbon compounds such as α-methylstyrene dimer, α-terpinene, γ-terpinene, dipentene, and terpinolene; and the like. These may be used alone, or two or more of these may be used in combination.

Also suitable as the above hydrophilic chain transfer agents are thiol chain transfer agents such as mercaptoethanol, thioglycerol, thioglycolic acid, mercaptopropionic acid, 2-mercaptopropionic acid, 3-mercaptopropionic acid, thiomalic acid, and 2-mercaptoethanesulfonic acid; primary alcohols such as 2-aminopropane-1-ol; secondary alcohols such as isopropanol; phosphorous acid, hypophosphorous acid and salts thereof (e.g. sodium hypophosphite, potassium hypophosphite), sulfurous acid, hydrosulfurous acid, dithionous acid, metabisulfurous acid, and salts thereof (e.g. sodium sulfite, sodium hydrogen sulfite, sodium dithionite, sodium metabisulfite, potassium sulfite, potassium hydrogen sulfite, potassium dithionite, potassium metabisulfite, sodium pyrosulfite), and like lower oxides and salts thereof. One or two or more species from the above-mentioned agents may be used.

As for the method of adding the above chain transfer agent to the reaction vessel, such a continuous charging method as dripping and divided charging can be applied. The chain transfer agent may be introduced singly into the reaction vessel, or it may be admixed in advance with the monomer or solvent.

In the above polymerization reaction, the polymerization temperature and other polymerization conditions are appropriately selected according to the polymerization method, solvent, polymerization initiator, and chain transfer agent employed. It is generally preferred that the polymerization temperature be not lower than 0° C. and not higher than 200° C. More preferably, 40° C. to 120° C., still more preferably 50° C. to 100° C., especially preferably 60° C. to 85° C.

The polymerization reaction is preferably made to stably proceed in order to provide a copolymer with a predetermined molecular weight at good reproducibility. Thus, the dissolved oxygen concentration at 25° C. in the solvent to be used is preferably 5 ppm or lower (preferably 0.01 to 4 ppm, more preferably 0.01 to 2 ppm, and further preferably 0.01 to 1 ppm) in the solution polymerization. In the case that processes such as nitrogen purging are performed after addition of the monomer components to the solvent, the dissolved oxygen concentration in the system including the monomer components is preferably in the above range.

The dissolved oxygen concentration of the solvent may be adjusted in a polymerization reaction tank, or may be adjusted preliminarily. Oxygen in the solvent may be removed by the following methods (1) to (5), for example.

(1) Inert gas such as nitrogen is introduced into an air-tightening container with a solvent charged therein under pressure, and then the pressure in the air-tightening container is decompressed so that the partial pressure of oxygen in the solvent is reduced. In this case, the pressure in the air-tightening container may be reduced under nitrogen flow.

(2) The liquid phase in the container with a solvent charged therein is stirred intensively for a long time, while the gas phase in the container is replaced by inert gas such as nitrogen.

(3) Inert gas such as nitrogen is bubbled for a long time into the solvent in a container.

(4) The solvent is boiled, and then cooled down under inert gas atmosphere such as nitrogen.

(5) A static mixer is placed at the middle of a piping, and the solvent is mixed with inert gas such as nitrogen in the piping that transfers the solvent to the polymerization reaction tank.

The copolymer obtained by the above polymerization reaction as such can be used for various applications including a dispersant for cement, and the like. Where necessary, it may be used after further neutralization with an alkaline substance. Preferably used as the alkaline substance are inorganic salts such as monovalent and divalent metal oxides, hydroxides, chlorides and carbonates; ammonia; organic amines, or the like.

The copolymers (1) and (2) of the present invention may be favorably used for various applications such as adhesives, sealants, flexibility-imparting components for various polymers, dispersants for cement, and builders for cleaning agents. In particular, they are preferably used for a dispersant for cement because of their extremely high cement dispersibility as mentioned above. Accordingly, the embodiment of the copolymers (1) and (2) as a copolymer for a dispersant for cement is one of the preferable embodiments of the present invention. Moreover, a dispersant for cement containing the copolymer (1) and/or the copolymer (2) is also one of the present inventions.

The copolymers (1) and (2) of the present invention can exhibit excellent dispersibility not only to cement having good fluidity, but also to cement having low fluidity (difficult cement), they are remarkably useful as a dispersant for cement. Specific examples of the cement having low fluidity (difficult cement) include cements containing component $C_3A$ and calcium oxide, wherein a total amount of said component $C_3A$ and of said calcium oxide in the cement is more than 4% by weight, and wherein the amount of said calcium oxide in the cement is more than 0.2% by weight. An embodiment of adding the aforementioned copolymer to such a cement containing said component $C_3A$ and said calcium oxide in said stated amounts is also one of the preferred embodiments of the present invention.

Examples of said cement containing said component $C_3A$ and said calcium oxide in said stated amounts include some of Cement Type CEM I 32.5 R (European Norm). Its composition is characterized by a relatively high $C_3A$ content (~9 wt %) and at the same time a relatively high content of face brine (CaO; >1 wt %)

[Dispersant for Cement]

The dispersant for cement of the present invention may be also used in combination with other additives for cement. Examples of the other additives for cement include the following dispersants for cement and additives (and materials) for cement, and each of these may be used alone or two or more of these may be used in combination. Particularly preferable among these is combination use of an oxyalkylene antifoaming agent and an AE agent.

Dispersants for cement such as a sulfonated dispersant having a sulfonic acid group in the molecule, or a polycarboxylic acid dispersant having a polyoxyalkylene chain and a carboxylic group in the molecule; and Additives (materials) for cement such as water-soluble macromolecular substances, polymer emulsions, retarders, high-early-strength agents or accelerators, mineral oil antifoaming agents, fat or oil antifoaming agents, fatty acid antifoaming agents, fatty acid ester antifoaming agents, oxyalkylene antifoaming agents, alcohol antifoaming agents, amido antifoaming agents, phosphate ester antifoaming agents, metal soap antifoaming agents, silicone antifoaming agents, AE (air-entraining) agents, surfactants, water-proof agents, water-retention agents, corrosion inhibitors, crack inhibitors, expansive additives, cement wetting agents, thickening agents, segregation reducing agents, flocculants, drying shrinkage reducing agents, agents to increase strength, self-leveling agents, colorants, antifungal agents, blast-furnace slag, fly ash, cinder ash, clinker ash, husk ash, silica fume, silica powder, and $CaSO_4 \cdot \mu H_2O$ binders (so-called gypsum binders).

The addition ratio of the additives for cement is preferably set such that the total amount of the additives is not more than 10 parts by weight for 100 parts by weight of the amount of the solid portion of the copolymer (1) and/or the copolymer (2).

The dispersant for cement of the present invention may be used in an aqueous solution form. After the reaction, the dispersant for cement is neutralized with a hydroxide of a mono- or divalent metal salt such as calcium and magnesium to be a polyvalent metal salt, and then dried; or carried on inorganic powders such as silica fine particles and then dried; or dried or solidified to be a thin film on a support using a drum drier, a disk drier, or belt drier, and then pulverized; or dried or solidified using a spray drier, thereby being pulverized. Further, the pulverized dispersant for cement of the present invention is previously mixed with a cement composition free from water, such as cement powders and dry mortar, and then used as a premix product used for plastering, floor finishing (e.g. screeds and self-levelling underlayments), grout, and the like, or added when the cement composition is mixed. In view of the handleability, an aqueous solution form is preferable for concrete applications while powder is more appropriate for clay-mix mortars.

The dispersant for cement of the present invention can be used in various hydraulic, latent-hydraulic and non-hydraulic materials, that is, cement compositions such as cement and gypsumplaster, and others. Specific examples of a hydraulic composition which contains such a hydraulic material, water, and the dispersant for cement of the present invention, and if necessary, a fine aggregate (e.g., sand) or a coarse aggregate (e.g., gravel) include cement paste, mortar, concrete, and cementitions plaster. Among these hydraulic compositions, the cement composition including cement as a hydraulic material is most common. Such a cement composition includes the dispersant for cement of the present invention, cement, and water. Preferably, a kind of cement containing component $C_3A$ and calcium oxide, wherein a total amount of said component $C_3A$ and of said calcium oxide in the cement is more than 4% by weight, and wherein the amount of said calcium oxide in the cement is more than 0.2% by weight is used as cement. Accordingly, the present invention also includes a cement composition which includes the copolymer (1) and/or the copolymer (2), water, and said cement containing said component $C_3A$ and said calcium oxide in said stated amounts. This cement composition is also one of the preferred embodiments of the present invention.

[Cement Composition]

The cement composition according to the present invention includes in addition to said copolymer (1) and/or said copolymer (2), water, and said cement containing component $C_3A$ and calcium oxide, wherein a total amount of said component $C_3A$ and of said calcium oxide in the cement is more than 4% by weight, and wherein the amount of calcium oxide in the cement is more than 0.2% by weight, and preferably further includes aggregates such as fine aggregates and coarse aggregate. Furthermore, the cement composition may furthermore include the other additives described earlier.

In the cement composition, an explanation of the cement containing component $C_3A$ and calcium oxide, wherein the total amount of said component $C_3A$ and of said calcium oxide in the cement is more than 4% by weight, and wherein the amount of said calcium oxide in the cement is more than 0.2% is as described earlier. Moreover, cement mentioned below may also be used.

Portland cements (ordinary, high early strength, ultrahigh early strength, middle-heat, sulfate-resistant, ultra-fine, and low-alkaline types thereof); various blended cements (blast furnace cement, silica cement, and flyash cement); white Portland cement; alumina cement; calcium sulfoaluminate cement; ultrarapid hardening cement (1 clinker rapid hardening cement, 2 clinker rapid hardening cement, and magnesium phosphate cement); grouting cement; oil well cement; low-heat cement (low-heat blast furnace cement, fly ash-mixed low-heat blast furnace cement, high belite-containing cement); ultrahigh strength cement; cement solidification material; and ecocement (cement produced from one or more such materials as municipal refuse incinerated ash and sludge incinerated ash), as well as those produced by adding finely powdered materials such as blast furnace slag, fly ash, cinder ash, clinker ash, husk ash, fumed silica, powdery silica, and powdery limestone and gypsum to the above species of cement.

Examples of the aggregate include gravel, rubble, steel slag, granulated slag, and regenerated aggregate, as well as fireproof aggregates made from silica stone, clay, zircon, high alumina, silicon carbide, graphite, chromium, chrome-magnesite, and magnesia.

The unit water content, cement content, and water/cement ratio (weight ratio) per 1 m$^3$ of the cement composition is preferably as follows: unit water content of 100 to 185 kg/m$^3$; cement content of 100 to 800 kg/m$^3$; and water/cement ratio (weight ratio) of 0.1 to 0.7. They are more preferably as follows: unit water content of 120 to 175 kg/m$^3$: cement content of 250 to 800 kg/m$^3$; and water/cement ratio (weight ratio) of 0.2 to 0.65. As mentioned here, the dispersant for cement containing the copolymer of the present invention may be used at a wide amount range from a small amount to a large amount. It may be used at a high water reducing ratio region, that is, a region with a water/cement ratio (weight ratio) as low as 0.15 to 0.5 (preferably 0.15 to 0.4). Further, it may be useful for high strength concrete with a large unit cement content and low water/cement ratio and low-amount concrete with a unit cement content of 300 kg/m$^3$ or less.

The dispersant for cement containing the copolymer of the present invention shows high fluidity, slump retaining ability, and workability at good balance even in the high water reducing ratio region, and has excellent workability. Thus, it is capable of being effectively used for concrete such as ready mixed concrete, concrete for concrete secondary products (precast concrete), concrete for centrifugal molding, concrete for compaction by vibration, autoclave concrete, steam curing concrete, and sprayed concrete. In addition, it is also useful for mortar and concrete which are required to have high fluidity such as middle performance concrete (concrete with a slump value of 22 to 25 cm), high performance concrete (concrete with a slump value of 25 cm or higher and with a slump flow value of 50 to 70 cm), self-compacting concrete, and self-leveling materials.

In the above-mentioned cement composition, the ratio of the amount of the copolymer of the present invention to be blended is preferably set to 0.01 to 10% by mass in solids content for 100% by mass in total of the cement weight. If the amount thereof is less than 0.01% by mass, the composition may insufficiently show its performance, while if the amount is more than 10% by mass, the performance thereof may not be improved substantially and may be disadvantageous from the economical view. The amount thereof is more preferably 0.02 to 8% by mass, and further preferably 0.05 to 6% by mass.

EFFECTS OF THE INVENTION

The copolymer of the present invention has the above-mentioned configuration. Therefore, the copolymer can exhibit excellent dispersibility to various kinds of cement including cement having low fluidity (difficult cement). Thus, the copolymer of the present invention is preferably used particularly for a dispersant for cement. The novel copolymer of the present invention and a dispersant for cement including the copolymer significantly contribute to civil engineering and construction fields where concrete is handled, and the like.

MODE FOR CARRYING OUT THE INVENTION

The following will describe the present invention in more detail referring to, but not limited to, examples.

Example 1

50.0 g of α-Allyl-ω-methoxy poly(ethylene glycol) macromonomer containing 34 ethylene oxide units in the side chain, 3.13 g of maleic anhydride and 1.93 g of ethylene glycol dimaleate were added to a five neck round bottom flask, heated to 90° C. and polymerized in bulk. Benzoyl peroxide of 1.0 g was used as radical initiator. The radical initiator was added uniformly as powder over 1.5 hours. At the end of initiator addition, the temperature was raised to 100° C. for another 1.5 hours. After the reaction was finished, deionized water was added to yield an aqueous solution with a solid content of 50 wt % prior to cooling. Thereafter, the aqueous polymer solution was cooled to room temperature and adjusted to pH 7 using a 30 wt % NaOH solution. The thus-obtained polymer had a weight average molecular weight of 137000.

Example 2

50.0 g of α-Allyl-ω-methoxy poly(ethylene glycol) macromonomer containing 34 ethylene oxide units in the side chain, 3.1 g of maleic anhydride and 5.4 g of allyl itaconate were added to a five neck round bottom flask, heated to 110° C. and polymerized in bulk. 4,4'-Azobis(4-cyanovaleric acid) of 3.1 g was used as radical initiator. The radical initiator was added uniformly as powder over 2 hours. At the end of initiator addition, the temperature was decreased to 90° C., and deionized water was added to yield an aqueous solution with a solid content of 50 wt % prior to cooling. Thereafter, the aqueous polymer solution was cooled to room temperature and adjusted to pH 7 using a 30 wt % NaOH solution. The thus-obtained polymer had a weight average molecular weight of 57600.

Example 3

50.0 g of α-Allyl-ω-methoxy poly(ethylene glycol) macromonomer containing 34 ethylene oxide units in the side chain, 3.1 g of maleic anhydride and 5.4 g of allyl citraconate were added to a five neck round bottom flask, heated to 110° C. and polymerized in bulk. 4,4'-Azobis(4-cyanovaleric acid) of 3.1 g was used as radical initiator. The radical initiator was added uniformly as powder over 2 hours. At the end of initiator addition, the temperature was decreased to 90° C., and deionized water was added to yield an aqueous solution with a solid content of 50 wt % prior to cooling. Thereafter, the aqueous polymer solution was cooled to room temperature and adjusted to pH 7 using a 30 wt % NaOH solution. The thus-obtained polymer had a weight average molecular weight of 11100.

Example 4

50.0 g of α-Allyl-ω-methoxy poly(ethylene glycol) macromonomer containing 34 ethylene oxide units in the side chain, 3.1 g of maleic anhydride and 6.3 g of (3-methyl-3-butenyl) itaconate were added to a five neck round bottom flask, heated to 110° C. and polymerized in bulk. 4,4'-Azobis (4-cyanovaleric acid) of 3.1 g was used as radical initiator. The radical initiator was added uniformly as powder over 2 hours. At the end of initiator addition, the temperature was decreased to 90° C., and deionized water was added to yield an aqueous solution with a solid content of 50 wt % prior to cooling. Thereafter, the aqueous polymer solution was cooled to room temperature and adjusted to pH 7 using a 30 wt % NaOH solution. The thus-obtained polymer had a weight average molecular weight of 42600.

Comparative Example 1

50.0 g of α-Allyl-ω-methoxy poly(ethylene glycol) macromonomer containing 34 ethylene oxide units in the side chain and 3.13 g of maleic anhydride were added to a five neck round bottom flask, heated to 90° C. and polymerized in bulk. Benzoyl peroxide of 1.0 g was used as radical initiator. The radical initiator was added uniformly as powder over 1.5 hours. At the end of initiator addition, the temperature was raised to 100° C. for another 1.5 hours. After the reaction was finished, deionized water was added to yield an aqueous solution with a solid content of 50 wt % prior to cooling. Thereafter, the aqueous PCE solution was cooled to room temperature and adjusted to pH 7 using a 30 wt % NaOH solution. The thus-obtained polymer had a weight average molecular weight of 63000.

Example 5

Water (85.0 g) was charged into a polymerization vessel and heated to 80° C. while the air in the vessel was replaced with nitrogen gas. Next, an aqueous monomer solution containing 83.4 g of poly (n=25) ethylene glycol monomethacrylate, 16.6 g of methacrylic acid, 1.6 g of mercapto propionic acid, 10.0 g of ethylene glycol dimaleate, and 25.0 g of water, and a catalyst solution containing 1 g of ammonium persulfate and 80 g of water were each added dropwise over four hours to the vessel. Thereafter, a catalyst solution containing 0.3 g of ammonium persulfate and 78.0 g of water was further added dropwise over one hour. The resulting solution was aged for one hour with the temperature inside the vessel maintained at 80° C. Next, the aqueous polymer solution was cooled to room temperature and adjusted to pH 7 using a 30 wt % NaOH solution. The thus-obtained polymer had a weight average molecular weight of 355000.

Example 6

Water (88.0 g) was charged into a polymerization vessel and heated to 80° C. while the air in the vessel was replaced with nitrogen gas. Next, an aqueous monomer solution containing 98.5 g of poly (n=23) ethylene glycol monomethacrylate, 22.4 g of methacrylic acid, 1.7 g of mercapto propionic acid, 14.1 g of poly (n=23) ethylene glycol dimethacrylate, and 32.1 g of water, and a catalyst solution containing 1.7 g of ammonium persulfate and 39.6 g of water were each added dropwise over four hours, and five hours to the vessel respectively. Thereafter, the resulting solution was aged for one hour with the temperature inside the vessel maintained at 80° C. Next, the aqueous polymer solution was cooled to room temperature and adjusted to pH 7 using a 30 wt % NaOH solution. The thus-obtained polymer had a weight average molecular weight of 85400.

Example 7

Water (89.7 g) was charged into a polymerization vessel and heated to 80° C. while the air in the vessel was replaced with nitrogen gas. Next, an aqueous monomer solution containing 98.5 g of poly (n=23) ethylene glycol monomethacrylate, 22.4 g of methacrylic acid, 0.8 g of mercapto propionic acid, 14.1 g of allyl-poly (n=35) ethylene glycol maleate, and 33.0 g of water, and a catalyst solution containing 1.6 g of ammonium persulfate and 39.1 g of water were each added dropwise over four hours, and five hours to the vessel respectively. Thereafter, the resulting solution was aged for one hour with the temperature inside the vessel maintained at 80° C. Next, the aqueous polymer solution was cooled to room temperature and adjusted to pH 7 using a 30 wt % NaOH solution. The thus-obtained polymer had a weight average molecular weight of 90200.

Comparative Example 2

Water (85.0 g) was charged into a polymerization vessel and heated to 80° C. while the air in the vessel was replaced with nitrogen gas. Next, an aqueous monomer solution containing 83.4 g of poly (n=25) ethylene glycol monomethacrylate, 16.6 g of methacrylic acid, 1.6 g of mercapto propionic acid, and 25.0 g of water, and a catalyst solution containing 1.0 g of ammonium persulfate and 80.0 g of water were each added dropwise over four hours to the vessel. Thereafter, a catalyst solution containing 0.3 g of ammonium persulfate and 78.0 g of water was further added dropwise over one hour. The resulting mixed solution was aged for one hour with the temperature inside the autoclave maintained at 80° C. Next, the aqueous polymer solution was cooled to room temperature and adjusted to pH 7 using a 30 wt % NaOH solution. The thus-obtained polymer had a weight average molecular weight of 68000.

Example 8

97.4 g of 80 wt % poly (n=50) ethylene glycol mono 3-methyl-3-butenyl ether, 0.1 g of acrylic acid and 17.3 g of water were charged into a polymerization vessel and heated to 60° C. while the air in the vessel was replaced with nitrogen gas. Then, 0.4 g of 30 wt % hydrogen peroxide in 6.2 g of water was added to the vessel. An aqueous monomer solution containing 11.1 g of acrylic acid, 4.8 g of poly (n=23) ethylene glycol dimethacrylate and 15.9 g of water, and a catalyst solution containing 0.2 g of L-ascorbic acid, 0.5 g of mercapto propionic acid and 46.1 g of water were each added dropwise over three hours, and three and a half hours respectively to the vessel. The resulting mixed solution was aged for one hour with the temperature inside the vessel maintained at 60° C. Next, the aqueous polymer solution was cooled to room temperature and adjusted to pH 7 using a 30 wt % NaOH solution. The thus-obtained polymer had a weight average molecular weight of 74200.

Example 9

96.3 g of 80 wt % poly (n=50) ethylene glycol mono 3-methyl-3-butenyl ether, 0.1 g of acrylic acid and 17.0 g of water were charged into a polymerization vessel and heated to 60° C. while the air in the vessel was replaced with nitrogen gas. Then, 0.4 g of 30 wt % hydrogen peroxide in 6.1 g of water was added to the vessel. An aqueous monomer solution containing 7.3 g of acrylic acid, 9.6 g of allyl itaconate and 16.9 g of water, and a catalyst solution containing 0.2 g of L-ascorbic acid, 0.7 g of mercapto propionic acid and 45.4 g of water were each added dropwise over three hours, and three and a half hours respectively to the vessel. The resulting mixed solution was aged for one hour with the temperature inside the vessel maintained at 60° C. Next, the aqueous polymer solution was cooled to room temperature and adjusted to pH 7 using a 30 wt % NaOH solution. The thus-obtained polymer had a weight average molecular weight of 84700.

Example 10

96.3 g of 80 wt % poly (n=50) ethylene glycol mono 3-methyl-3-butenyl ether, 0.1 g of acrylic acid and 17.0 g of water were charged into a polymerization vessel and heated to 60° C. while the air in the vessel was replaced with nitrogen gas. Then, 0.4 g of 30 wt % hydrogen peroxide in 6.1 g of water was added to the vessel. An aqueous monomer solution containing 7.3 g of acrylic acid, 9.6 g of allyl citraconate and 16.9 g of water, and a catalyst solution containing 0.2 g of L-ascorbic acid, 0.7 g of mercapto propionic acid and 45.4 g of water were each added dropwise over three hours, and three and a half hours respectively to the vessel. The resulting mixed solution was aged for one hour with the temperature inside the vessel maintained at 60° C. Next, the aqueous polymer solution was cooled to room temperature and adjusted to pH 7 using a 30 wt % NaOH solution. The thus-obtained polymer had a weight average molecular weight of 67400.

Example 11

97.4 g of 80 wt % poly (n=50) ethylene glycol mono 3-methyl-3-butenyl ether, 0.1 g of acrylic acid and 16.6 g of water were charged into a polymerization vessel and heated to 60° C. while the air in the vessel was replaced with nitrogen gas. Then, 0.5 g of 30 wt % hydrogen peroxide in 6.8 g of water was added to the vessel. An aqueous monomer solution containing 11.1 g of acrylic acid, 4.9 g of (3-methyl-3-butenyl) itaconate and 15.9 g of water, and a catalyst solution containing 0.2 g of L-ascorbic acid, 0.8 g of mercapto propionic acid and 45.8 g of water were each added dropwise over three hours, and three and a half hours respectively to the vessel. The resulting mixed solution was aged for one hour with the temperature inside the vessel maintained at 60° C. Next, the aqueous polymer solution was cooled to room temperature and adjusted to pH 7 using a 30 wt % NaOH solution. The thus-obtained polymer had a weight average molecular weight of 1222000.

Example 12

97.4 g of 80 wt % poly (n=50) ethylene glycol mono 3-methyl-3-butenyl ether, 0.1 g of acrylic acid and 16.6 g of water were charged into a polymerization vessel and heated to 60° C. while the air in the vessel was replaced with nitrogen gas. Then, 0.5 g of 30 wt % hydrogen peroxide in 6.8 g of water was added to the vessel. An aqueous monomer solution containing 11.1 g of acrylic acid, 4.9 g of (3-methyl-3-butenyl) itaconate and 15.9 g of water, and a catalyst solution containing 0.2 g of L-ascorbic acid, 1.4 g of mercapto propionic acid and 45.2 g of water were each added dropwise over three hours, and three and a half hours respectively to the vessel. The resulting mixed solution was aged for one hour with the temperature inside the vessel maintained at 60° C. Next, the aqueous polymer solution was cooled to room temperature and adjusted to pH 7 using a 30 wt % NaOH solution. The thus-obtained polymer had a weight average molecular weight of 58000.

Example 13

96.3 g of 80 wt % poly (n=50) ethylene glycol mono 3-methyl-3-butenyl ether, 0.1 g of acrylic acid and 18.8 g of water were charged into a polymerization vessel and heated to 60° C. while the air in the vessel was replaced with nitrogen gas. Then, 0.3 g of 30 wt % hydrogen peroxide in 4.5 g of water was added to the vessel. An aqueous monomer solution containing 7.2 g of acrylic acid, 9.6 g of allyl-poly (n=35) ethylene glycol maleate and 16.9 g of water, and a catalyst solution containing 0.1 g of L-ascorbic acid, 0.4 g of mercapto propionic acid and 45.8 g of water were each added dropwise over three hours, and three and a half hours respectively to the vessel. The resulting mixed solution was aged for one hour with the temperature inside the vessel maintained at 60° C. Next, the aqueous polymer solution was cooled to room temperature and adjusted to pH 7 using a 30 wt % NaOH solution. The thus-obtained polymer had a weight average molecular weight of 86200.

Example 14

94.0 g of 80 wt % poly (n=50) ethylene glycol mono 3-methyl-3-butenyl ether, 0.2 g of acrylic acid and 18.4 g of water were charged into a polymerization vessel and heated to 60° C. while the air in the vessel was replaced with nitrogen gas. Then, 0.3 g of 30 wt % hydrogen peroxide in 4.3 g of water was added to the vessel. An aqueous monomer solution containing 9.2 g of acrylic acid, 9.4 g of (3-methyl-3-butenyl)-poly (n=50) ethylene glycol maleate and 18.6 g of water, and a catalyst solution containing 0.1 g of L-ascorbic acid, 0.5 g of mercapto propionic acid and 44.9 g of water were each added dropwise over three hours, and three and a half hours respectively to the vessel. The resulting mixed solution was aged for one hour with the temperature inside the vessel maintained at 60° C. Next, the aqueous polymer solution was cooled to room temperature and adjusted to pH 7 using a 30 wt % NaOH solution. The thus-obtained polymer had a weight average molecular weight of 114500.

Example 15

96.3 g of 80 wt % poly (n=50) ethylene glycol mono 3-methyl-3-butenyl ether, 0.1 g of acrylic acid and 18.8 g of water were charged into a polymerization vessel and heated to 60° C. while the air in the vessel was replaced with nitrogen gas. Then, 0.3 g of 30 wt % hydrogen peroxide in 4.4 g of water was added to the vessel. An aqueous monomer solution containing 7.2 g of acrylic acid, 9.6 g of (3-methyl-3-butenyl)-poly (n=50) ethylene glycol citraconate and 16.9 g of water, and a catalyst solution containing 0.1 g of L-ascorbic acid, 0.2 g of mercapto propionic acid and 46.0 g of water were each added dropwise over three hours, and three and a half hours respectively to the vessel. The resulting mixed solution was aged for one hour with the temperature inside the vessel maintained at 60° C. Next, the aqueous polymer solution was cooled to room temperature and adjusted to pH 7 using a 30 wt % NaOH solution. The thus-obtained polymer had a weight average molecular weight of 95800.

Comparative Example 3

103.5 g of 80 wt % poly (n=50) ethylene glycol mono 3-methyl-3-butenyl ether, 0.2 g of acrylic acid and 25.3 g of water were charged into a polymerization vessel and heated to 60° C. while the air in the vessel was replaced with nitrogen gas. Then, 0.4 g of 30 wt % hydrogen peroxide in 6.1 g of water was added to the vessel. An aqueous monomer solution containing 11.1 g of acrylic acid and 11.1 g of water, and a catalyst solution containing 0.2 g of L-ascorbic acid, 0.4 g of mercapto propionic acid and 48.3 g of water were each added dropwise over three hours, and three and a half hours respectively to the vessel. The resulting mixed solution was aged for one hour with the temperature inside the vessel maintained at 60° C. Next, the aqueous polymer solution was cooled to room temperature and adjusted to pH 7 using a 30 wt % NaOH solution. The thus-obtained polymer had a weight average molecular weight of 101200.

Performance Test with Cement Using "Mini Slump" Test

For the determination of the paste flow, a "mini slump" test was utilized and carried out as follows: First, a constant water to cement (w/c) ratio of 0.3 was chosen. At this w/c ratio, the dosages of polymers required to reach a spread of 26±1 cm were determined. Generally, the polymer was added to the required amount of mixing water placed in a porcelain casserole. When aqueous polymer solutions were used, then the amount of water contained in the polymer solution was subtracted from the amount of mixing water. Next, 350 g of cement were added to the mixing water and agitated by hand for 1 minute, then rested for 1 minute without stirring. This was followed by intensive stirring for another 2 minutes. Thereafter, the cement paste was immediately poured into a Vicat cone (height 40 mm, top diameter 70 mm, bottom diameter 80 mm) placed on a glass plate and the cone was vertically removed. The resulting spread of the paste was measured twice, the second measurement being in a 90° angle to the first and averaged to give the spread value. Tables 1 and 2 show the result.

TABLE 1

| | Cement A type CEM I 42.5 R | | Cement B type CEM I 32.5 R | |
|---|---|---|---|---|
| | Addition amount of copolymer (wt %) | Flow value (cm) | Addition amount of copolymer (wt %) | Flow value (cm) |
| Example 1 | 0.2 | 27.2 | 0.2 | 14.7 |
| Comparative Example 1 | 0.2 | 26.2 | 0.2 | 9.6 |
| Example 5 | 0.12 | 24.0 | 3.9 | 26.0 |
| Comparative Example 2 | 0.12 | 25.5 | 0.6 | 22.3 |

In Table 1, "addition amount of copolymer (wt %)" refers to the amount of the solid portion of each copolymer relative to cement.

Based on Table 1, a comparison between Example 1 using the copolymer of the present invention and Comparative Example 1 reveals that the flow values were significantly changed especially in the case of addition to cement B, rather than in case of addition to cement A. Moreover, a comparison of the flow values from Example 5 using the copolymer of the present invention and from Comparative Example 2 in the case of addition to cement B reveals that the flow value was higher for Example 5, even though the amount of Example 5 added to cement B was smaller.

Those results confirm that the copolymer of the present invention can exhibit remarkably excellent dispersibility not only to cement A, but also to cements having low fluidity (difficult cements) such as cement B.

TABLE 2

| | PCE dosage (%)/Flow (cm) | | |
|---|---|---|---|
| PCE | Cement A type CEM I 42.5 R | Cement B type CEM I 32.5 R | Cement C type CEM I 52.5 R |
| Comparative Example 1 | 0.20%/26.2 cm | not attainable to 26 cm | 0.30%/25.5 cm |
| Example 1 | 0.20%/27.2 cm | 0.40%/26.0 cm | 0.21%/26.0 cm |
| Example 2 | 0.26%/25.6 cm | 0.75%/25.9 cm | 0.24%/25.8 cm |
| Example 3 | 0.24%/25.7 cm | 1.00%/25.7 cm | 0.22%/25.5 cm |
| Example 4 | 0.28%/26.2 cm | 1.00%/25.8 cm | 0.26%/25.9 cm |
| Comparative Example 2 | 0.12%/25.5 cm | not attainable to 26 cm | 0.12%/26.3 cm |
| Example 5 | 0.12%/24.0 cm | 0.39%/26.0 cm | 0.12%/26.0 cm |
| Example 6 | 0.17%/26.1 cm | 1.00%/21.8 cm | 0.17%/26.3 cm |
| Example 7 | 0.19%/25.8 cm | 0.80%/26.1 cm | 0.08%/25.5 cm |
| Comparative Example 3 | 0.11%/26.2 cm | 0.70%/26.1 cm | 0.11%/26.5 cm |
| Example 8 | 0.12%/25.5 cm | 0.32%/25.6 cm | 0.12%/26.5 cm |
| Example 9 | 0.185%/26.2 cm | 0.45%/25.9 cm | 0.17%/26.2 cm |
| Example 10 | 0.19%/26.1 cm | 0.35%/25.9 cm | 0.13%/26.4 cm |
| Example 11 | 0.35%/26.1 cm | 0.35%/26.2 cm | 0.25%/26.2 cm |
| Example 12 | 0.135%/25.6 cm | 0.25%/26.3 cm | 0.11%/25.7 cm |
| Example 13 | 0.12%/25.9 cm | 0.40%/25.5 cm | 0.14%/25.8 cm |
| Example 14 | 0.135%/26.4 cm | 0.40%/25.8 cm | 0.125%/25.6 cm |
| Example 15 | 0.12%/26.3 cm | 0.40%/25.6 cm | 0.12%/25.7 cm |

In Table 2, "PCE dosage" refers to the amount of the solid portion of each copolymer relative to cement.

Based on Table 2, the PCE dosage to obtain the flow of 26±1 cm was compared between Examples using the copolymer of the present invention and Comparative Examples: that is, Examples 1 to 4 and Comparative Example 1; Examples 5-7 and Comparative Example 2; Examples 8 to 15 and Comparative Example 3. In the case of each comparative examples, it reveals that all of the dosages for cement B significantly increased more than those for cement A and cement C, especially in Comparative Examples 1 and 2 the flows could not attain to the target value of 26±1 cm, when cement B was used.

Those results confirm that the copolymer of the present invention can exhibit remarkably excellent dispersibility to cement having low fluidity (difficult cements) such as cement B.

In a different small scale test, the results were confirmed by comparing the dispersibility using a polymer as described in comparative example 2. The procedure was carried out as follows: First, a constant water to cement (w/c) ratio of 0.3 was chosen. At this w/c ratio, the dosage of comparative example 2 required to reach a spread of 16±0.5 cm were determined. Generally, the polymer was added to the required amount of mixing water placed in a porcelain casserole. When aqueous polymer solutions were used, then the amount of water contained in the polymer solution was subtracted from the amount of mixing water. Next, 75 g of cement were added to the mixing water and agitated by hand for 1 minute, then rested for 1 minute without stirring. This was followed by intensive stirring for another 2 minutes. Thereafter, the cement paste was immediately poured into a brass cylinder (height 50 mm, inner diameter 30 mm) placed on a glass plate and the cylinder was vertically removed. The resulting spread of the paste was measured twice, the second measurement being in a 90° angle to the first and averaged to give the spread value. At this polymer dosage, all other cements were tested and compared using the same method. Low flow values indicate difficult dispersibility. Data is shown in Table 3.

Here, Cement D, Cement E, Cement F, and Cement G were from China.

TABLE 3

Dispersibility of different cements with comparative example 2

| Cement | Paste flow | PCE Dosage | Dispersibility |
|---|---|---|---|
| Cement A type CEM I 42.5 R | 16.3 cm | 0.15% | Easy |
| Cement B type CEM I 32.5 R | 6.8 cm | 0.15% | Difficult |
| Cement C type CEM I 52.5 R | 15.2 cm | 0.15% | Easy |
| Cement D type | 8.0 cm | 0.15% | Difficult |
| Cement E type | 15.6 cm | 0.15% | Easy |
| Cement F type | 15.5 cm | 0.15% | Easy |
| Cement G type | 8.2 cm | 0.15% | Difficult |

Determination of $C_3A$ and CaO Contents of Cements—Difficult Cement

The CaO content of the cements has been determined according to "Franke". 1.000 g of cement was added to a mixture of 20 mL absolute dry isopropanol and 5 mL absolute dry ethylacetoacetate. The mixture was heated while stirring to reflux for 1 h. After cooling, the mixture was filtrated and the residue washed with further 50 mL of absolute dry isopropanol. Afterwards, 2 drops of bromothymol blue were added to the solution and titrated with 0.1 M HCl solution from blue to green colour. The amount of CaO can then be calculated by the volume of used HCl solution: $n(CaO)=0.5 n(HCl)$.

The $C_3A$ content and phase composition was determined by quantitative x-ray diffraction (Q-XRD; instrument: Bruker axs D8, software: Topas 4.0) using "Rietveld" refinement. Since the "Rietveld" refinement is depending on human input, the final results of $C_3A$ contents are afflicted with an error of ±1%. Results are presented in Table 4.

TABLE 4

Cement $C_3A$ and CaO contents

| Cement | $C_3A$ | CaO | Dispersibility |
|---|---|---|---|
| Cement A type CEM I 42.5 R | 8.4 ± 1% | 0.10% | Easy |
| Cement B type CEM I 32.5 R | 9.3 ± 1% | 2.20% | Difficult |
| Cement C type GEM I 52.5 R | 1.1 ± 1% | 0.50% | Easy |
| Cement D type | 3.8 ± 1% | 0.70% | Difficult |
| Cement E type | 4.9 ± 1% | 0.10% | Easy |
| Cement F type | 2.4 ± 1% | 0.90% | Easy |
| Cement G type | 8.3 ± 1% | 0.70% | Difficult |

The invention claimed is:

1. A copolymer obtained by polymerizing monomer components comprising an unsaturated (poly)alkylene glycol ether monomer (a), an unsaturated carboxylic acid monomer (b), and an unsaturated cross-linkable monomer (c),
    wherein the unsaturated (poly)alkylene glycol ether monomer (a) is a compound represented by the formula (1):

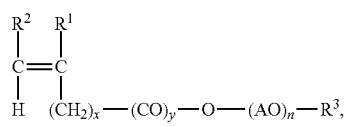

(1)

in the formula:
    $R^1$ and $R^2$ are the same as or different from each other and each represent a hydrogen atom or a methyl group;
    $R^3$ represents a hydrogen atom or a hydrocarbon group containing 1 to 30 carbon atoms;
    AOs are the same as or different from each other and each represent one or more different oxyalkylene groups containing 2 to 18 carbon atoms, wherein if there are two or more different oxyalkylene groups they are introduced in a form of blocks or randomly;
    n represents the average number of moles of the added oxyalkylene group and is a number from 1 to 300;
    x is an integer of 0 to 2; and
    y is 0 or 1,
    wherein the unsaturated cross-linkable monomer (c) is at least one selected from the group consisting of a compound (c-i), a compound (c-ii), and a compound (c-iii),
    the compound (c-i) being an allyl itaconate,
    the compound (c-ii) being an allyl citraconate,
    the compound (c-iii) being an ester compound obtained by a reaction of at least one acid selected from the group consisting of itaconic acid and citraconic acid or an acid ester derived from the acid, and one alcohol selected from the group consisting of vinyl alcohol, (meth)allyl alcohol and isoprene alcohol (3-methyl-3-buten-1-ol),
    wherein a content ratio of the monomers components (% by mass) is monomer(a)/monomer(b)/monomer(c)/=from 55 to 96/from 2 to 40/from 2 to 40/.

2. A copolymer obtained by polymerizing monomer components comprising an unsaturated (poly)alkylene glycol ether monomer (a), an unsaturated carboxylic acid monomer (b), and an unsaturated cross-linkable monomer (d),
    wherein the unsaturated (poly)alkylene glycol ether monomer (a) is a compound represented by the formula (1):

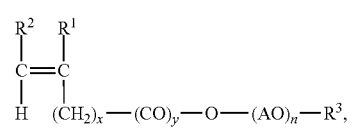

(1)

in the formula:
    $R^1$ and $R^2$ are the same as or different from each other and each represent a hydrogen atom or a methyl group;
    $R^3$ represents a hydrogen atom or a hydrocarbon group containing 1 to 30 carbon atoms;
    AOs are the same as or different from each other and each represent one or more different oxyalkylene groups containing 2 to 18 carbon atoms, wherein if there are two or more different oxyalkylene groups they are introduced in a form of blocks or randomly;
    n represents the average number of moles of the added oxyalkylene group and is a number from 1 to 300;
    x is an integer of 0 to 2; and
    y is 0 or 1,
    wherein the unsaturated cross-linkable monomer (d) is at least one selected from the group consisting of a compound (d-i), and a compound (d-ii);
    the compound (d-i) being a di-, a tri-, a tetra-, or a polyester compound having at least two unsaturated double bonds obtained by a reaction of at least one acid selected from the group consisting of (meth)acrylic acid, maleic acid, fumaric acid, itaconic acid, citraconic acid and an acid ester derived from the acid thereof, and (poly)alkylene glycol; and the compound (d-ii) being a mono-, or a diester compound obtained by a reaction of at least one acid selected from the group consisting of (meth)acrylic acid, maleic acid, fumaric acid, itaconic acid, and citraconic acid, or an acid ester derived from the acid thereof, and at least one ether compound selected from the group consisting of (poly)alkylene glycol vinyl ether, (poly)alkylene glycol (meth)allyl ether, and (poly)alkylene glycol (3-methyl-3-butenyl) ether, wherein a content ratio of the monomers components (% by mass) is monomer(a)/monomer(b)/monomer(d)/=from 55 to 96/from 2 to 40/from 2 to 40/.

3. The copolymer according to claim 1,
wherein the copolymer is added to a cement containing tricalcium aluminate and calcium oxide,
a total amount of the tricalcium aluminate and the calcium oxide in the cement is more than 4% by weight, and
the amount of the calcium oxide in the cement is more than 0.2% by weight.

4. A dispersant for cement, comprising the copolymer according to claim 1.

5. A cement composition, comprising the copolymer according to claim 1, a cement, and water,
wherein the cement contains tricalcium aluminate and calcium oxide,
a total amount of the tricalcium aluminate and calcium oxide in the cement is more than 4% by weight, and
the amount of the calcium oxide in the cement is more than 0.2% by weight.

6. The copolymer according to claim 2,
wherein the copolymer is added to a cement containing tricalcium aluminate and calcium oxide,
a total amount of the tricalcium aluminate and the calcium oxide in the cement is more than 4% by weight, and
the amount of the calcium oxide in the cement is more than 0.2% by weight.

7. A dispersant for cement, comprising the copolymer according to claim 2.

8. A cement composition, comprising the copolymer according to claim 2, a cement, and water,
wherein the cement contains tricalcium aluminate and calcium oxide,
a total amount of the tricalcium aluminate and calcium oxide in the cement is more than 4% by weight, and
the amount of the calcium oxide in the cement is more than 0.2% by weight.

9. The copolymer of claim 1, further comprising a monomer (e1), in an amount of 30% by mass or less relative to 100% by mass of all the monomer components, wherein the monomer (e1) is other than the monomer (a), the monomer (b) and the monomer (c).

10. The copolymer of claim 2, further comprising a monomer (e2), in an amount of 30% by mass or less relative to 100% by mass of all the monomer components, wherein the monomer (e2) is other than the monomer (a), the monomer (b) and the monomer (d).

11. The copolymer of claim 1, wherein the copolymer has a weight average molecular weight of 11,100 to 5,000,000.

12. The copolymer of claim 2, wherein the copolymer has a weight average molecular weight of 20,000 to 5,000,000.

13. The copolymer of claim 1, wherein a content ratio of the monomer components (% by mass) is:
monomer (a)/monomer (b)/monomer (c)/=from 81.9 to 90.8/from 5.2 to 11.9/from 3.5 to 10.6/.

14. The copolymer of claim 2, wherein a content ratio of the monomer components (% by mass) is:
monomer (a)/monomer (b)/monomer (d)/=from 73 to 83/from 7.8 to 16.6/from 5 to 10/.

15. The copolymer claim 1, wherein the monomer (a) is polyethylene glycol mono (3-methyl-3-butenyl) ether, the monomer (b) is acrylic acid, and the monomer (c) is (3-methyl-3-butenyl) itaconate.

* * * * *